(12) United States Patent
Newman et al.

(10) Patent No.: US 6,510,720 B1
(45) Date of Patent: Jan. 28, 2003

(54) HYDRAULIC PRESSURE FORMING USING A SELF ALIGNING AND ACTIVATING DIE SYSTEM

(75) Inventors: Craig Alan Newman, East Lansing, MI (US); John Aubrey Neate, Niles, MI (US); Tom Ray Feguer, Grand Ledge, MI (US); Steven Edward Wallace, Flushing, MI (US)

(73) Assignee: Hartwick Professionals, Inc., Lansing, MI (US)

( * ) Notice: Subject to any disclaimer, the term of this patent is extended or adjusted under 35 U.S.C. 154(b) by 0 days.

(21) Appl. No.: 09/982,902

(22) Filed: Oct. 18, 2001

(51) Int. Cl.[7] .......................... B21D 26/02; B21D 39/00
(52) U.S. Cl. ................ 72/61; 72/62; 29/421.1
(58) Field of Search .............. 72/61, 62, 58, 72/55; 29/421.1

(56) References Cited

U.S. PATENT DOCUMENTS

| | | | |
|---|---|---|---|
| 3,092,898 A | | 6/1963 | Cave et al. |
| 3,187,533 A | | 6/1965 | Cave et al. |
| 4,319,471 A | * | 3/1982 | Benteler et al. ............... 72/59 |
| 4,951,492 A | * | 8/1990 | Vogt ............... 59/62 |
| 5,233,854 A | | 8/1993 | Bowman et al. |
| 5,349,839 A | * | 9/1994 | Weykamp et al. ............ 72/296 |
| 5,485,737 A | | 1/1996 | Dickerson |
| 5,568,742 A | * | 10/1996 | Bauer ........................... 72/61 |
| 5,600,983 A | | 2/1997 | Rigsby |
| 5,641,176 A | | 6/1997 | Alatalo |
| 5,673,929 A | | 10/1997 | Alatalo |
| 5,775,153 A | | 7/1998 | Rigsby et al. |
| 5,882,039 A | | 3/1999 | Beckman et al. |
| 5,918,494 A | | 7/1999 | Kojima et al. |
| 5,927,120 A | * | 7/1999 | Marando ...................... 72/58 |
| 5,941,112 A | | 8/1999 | Ghiran et al. |
| 5,953,945 A | | 9/1999 | Horton |
| 6,006,567 A | | 12/1999 | Brown et al. |
| 6,014,879 A | | 1/2000 | Jaekel et al. |
| 6,015,182 A | | 1/2000 | Weissert et al. |
| 6,016,603 A | | 1/2000 | Marando et al. |
| 6,032,501 A | | 3/2000 | Bihrer |
| 6,055,715 A | | 5/2000 | Ni et al. |
| 6,067,831 A | | 5/2000 | Amborn et al. |
| 6,098,437 A | * | 8/2000 | Kocer et al. .................. 72/55 |
| 6,105,409 A | | 8/2000 | Kojima et al. |
| 6,138,358 A | | 10/2000 | Marando |
| 6,151,940 A | | 11/2000 | Amborn et al. |
| 6,170,309 B1 | | 1/2001 | Marando |
| 6,183,013 B1 | | 2/2001 | Mackenzie et al. |
| 6,322,645 B1 | * | 11/2001 | Dykstra et al. ............. 148/520 |
| 6,386,009 B1 | * | 5/2002 | Ni et al. ...................... 29/421.1 |

* cited by examiner

Primary Examiner—David Jones
(74) Attorney, Agent, or Firm—John M. Naber

(57) ABSTRACT

The present invention provides a hydroforming system and method eliminating the need for a solid steel die (or mold) set operated by a conventional high tonnage hydraulic press. The invention utilizes a fabricated or bar-stock die set integrated to a series of adjustably placed hydraulic cylinders to create a self-contained operating unit. The system can include a die set, a plurality of activation and clamping hydraulic cylinders, a computer control system and reinforcement and support structures. The die set can be a mounted lower die half and an adjacent movable upper die half, each constructed of individual pieces of plate or bar stock. The computer control system interprets incoming linear position data from all of the activation hydraulic cylinders and monitors and controls hydraulic fluid flow into and out of each cylinder. The system can also have a plurality of support pillars affixed to the lower die half.

21 Claims, 5 Drawing Sheets

HYDRAULIC PRESSURE FORMING USING A SELF ALIGNING AND ACTIVATING DIE SYSTEM

BACKGROUND OF THE INVENTION

1. Field of the Invention

The present invention relates generally to hydroforming, and specifically to hydroforming using a self-aligning and activating die system.

2. Discussion of the Prior Art

Various processes exist to create complex shapes and cross sections. One such process is hydroforming. Hydroforming is a process used to form metal by applying pressurized fluid to the interior wall of a tube (or a sheet of material). Hydroforming creates complex components from inexpensive tubing or sheeting and eliminates the need for expensive multi-piece stamped and welded assemblies.

Tube hydroforming generally involves placing a straight or pre-formed tube in a die set. Pre-formed tubes are created by manually operated benders or computer numeric controlled (CNC) benders. The creation of pre-formed tubes by CNC benders is well known in the prior art. The die set used in tube hydroforming is contained within a large forming press. In hydroforming, the tube is placed in the die set, the die set is closed and pressurized fluid is introduced into the ends of the tube. Fluid pressure forces the walls of the tube to expand and conform to the shape of the die cavity. The size of the press depends on the surface area, wall thickness and/or the geometry of the required pieces.

Currently, large presses are required to create the force necessary to keep the die halves or molds from separating during hydroforming. A typical high tonnage (greater than 500 ton) vertical hydroform press requires special installation and needs deep foundations of reinforced concrete. These presses can weigh many tons and can be over twenty (20) feet in height.

Vertical hydroform presses are also expensive. Their large size and weight usually require these presses to be assembled in one facility, disassembled, shipped in sections, and re-assembled on-site. This also increases cost and star-up time. Thus, conventional vertical hydroform presses are long-term investments.

Conventional hydroform dies/molds are similarly expensive. The dies/molds are typically machined from at least two rectangular solid steel billets. Often, billet machining will remove as much as fifty percent of the original material, thus adding to overall cost. Nevertheless, the dies must be strong enough to maintain the die set in a closed position during hydroforming.

Due to the size and expense of hydroform systems, hydroforming part production is usually restricted to high volume parts (e.g., more than 100,000 units annually). Mid and low volume product runs or short life span product runs are often cost prohibitive.

Thus, there is a need for a new type of hydroforming system capable of handling large or thick walled workpieces, yet is relatively small, simple, and inexpensive in construction and operation. Such systems have been attempted, See generally, U.S. Pat. No. 5,927,120 to Marando. Marando claims a device that allows use of a smaller die set. The die set is placed in an inflatable bladder against the die set's tool holder. The bladder is designed to minimize the effects of the smaller die's deflections during the hydroforming process. Also, U.S. Pat. Nos. 3,092,898 and 3,187,533 to Cave et al. use pressure arms and cylinders to minimize press deflections and thus allow reduction in overall press size.

Unfortunately, the invention in Marando does not create a large variety of workpiece shapes. The press in Marando is still large and expensive. Further, mid to low production runs are still cost prohibitive. The Marando system would also not be practical for complex large or long shaped pieces. Similarly, the Cave et al. patent had limited application and was intended to limit expansion of sheets bonded together so as to expand un-bonded passageways. Again, design flexibility and control were limited.

SUMMARY OF THE INVENTION

Accordingly, the present invention provides an improved hydroforming system. The improved system can eliminate the need for a solid steel die (or mold) set operated by a conventional high tonnage hydraulic press. The present invention utilizes a fabricated or bar-stock die set integrated to a series of adjustably placed hydraulic cylinders to create a self-contained operating unit.

The system includes a die set, a plurality of hydraulic cylinders and system controllers.

The die set is made up of a mounted lower die half and an adjacent movable upper die half. The die halves in combination having an interior surface that defines a shape of a die cavity. The upper die half having a first set of reinforcement plates attached along an exterior surface of the upper die half and the lower die half having a second set of reinforcement plates attached along an exterior surface of the lower die half.

The die halves can be comprised of either a plurality of individual plates or a plurality of solid steel bar-stock pieces fastened together to form a die cavity. The individual plates or bar-stock pieces can be fastened together by conventional means, such as welding or bolting.

The plurality of hydraulic cylinders includes a plurality of activation hydraulic cylinders and a plurality of clamping hydraulic cylinders. Each activation hydraulic cylinder has a first clamping chamber, a first extension chamber, a first translation capable linear movement/linear transition mounted rod (first cylinder rod) having a first translation capable linear movement/linear transition mounted rod end (first cylinder rod end), and a first piston. Each clamping hydraulic cylinders has a second clamping chamber, a second extension chamber, a second translation capable linear movement/linear transition mounted rod (second cylinder rod) having a second translation capable linear movement/linear transition mounted rod end (second cylinder rod end), and a second piston.

The activation hydraulic cylinders and clamping hydraulic cylinders are arranged on the periphery of the die set to distribute reaction forces as equally as possible. The disclosed embodiments show the activation and clamping hydraulic cylinders in opposing and alternating layouts. The system requires at least two activation hydraulic cylinders to be present. In another embodiment, the system only uses activation hydraulic cylinders.

The system is controlled by a computer control system. The computer control system includes linear transducers encased in each activation hydraulic cylinder that transmit continuous linear position data to the computer control system. The computer control system interprets incoming data from all of the activation hydraulic cylinders and monitors and controls hydraulic fluid flow into and out of each of the activation and clamping hydraulic cylinders to insure uniform speed, position, and self-alignment of the first cylinder rod ends. This measurement and control insures the mounted lower die half and the movable upper die half remain parallel with each other.

The system can have a single power unit to create both the fluid pressure used to form the workpiece and the hydraulic pressure used to clamp the plurality of activation and clamping hydraulic cylinders. Alternatively, multiple power units can be used.

The system can also have a plurality of support pillars affixed to the lower die half. The support pillars can place the hydroforming system at a height convenient for a typical worker. The support pillars can be affixed to the lower die half at one end and affixed to the floor at the other end. The support pillars can also support the weight of the entire system and prevent the system from moving during operation.

Other objects of the present invention will become more apparent to persons having ordinary skill in the art to which the present invention pertains from the following description taken in conjunction with the accompanying figures.

BRIEF DESCRIPTION OF THE FIGURES

The foregoing objects, advantages, and features, as well as other objects and advantages, will become apparent with reference to the description and figures below, in which like numerals represent like elements and in which.

DETAILED DESCRIPTION OF THE INVENTION

The present invention relates to an improved hydroforming system that replaces a large solid steel die set (or mold set) mounted to a conventional high tonnage hydraulic press. Instead, the present invention is a hydroforming system including a fabricated or bar-stock die set integrated to a series of strategically placed hydraulic cylinders.

The present invention is a self-contained, self-aligning and self-activating die system capable of developing the pressure required for conventional hydroforming in a smaller, lighter and less expensive package when compared to a conventional hydroforming system.

The system of the present invention can be operated on a typical six-inch reinforced concrete factory floor, eliminating the need for a larger concrete pad as required by conventional hydroforming systems. The system can be assembled, tested, demonstrated and approved in one facility and shipped to the manufacturing plant as a "turn-key" operation. Thus, the system provides a cost advantage, reduced capital cost, and a faster time to production.

FIGS. 1 through 6 illustrate one embodiment of a hydroforming system 20 of the present invention. The major components of the system are the die (mold) set, hydraulic cylinders and system controllers.

Figure 2:
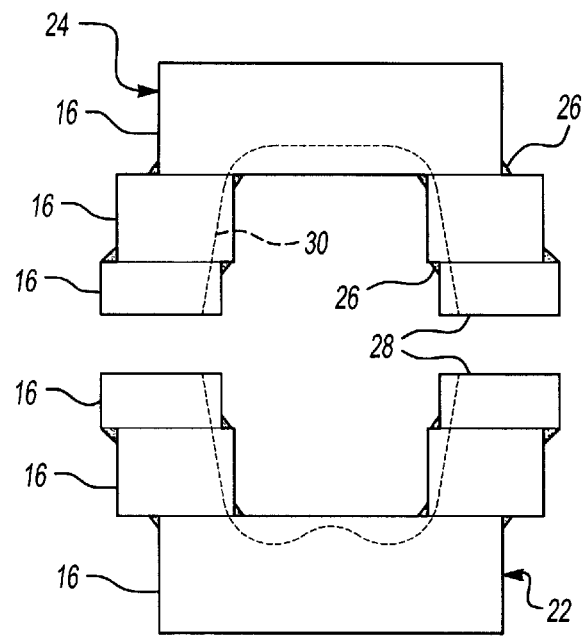
FIG. 2 illustrates a side view of a fabricated die set of the present invention before the die cavity is machined.

FIG. 2 illustrates the die halves (mold halves) of a die set before the die cavity is machined. The die halves can be formed from a plurality of individual plates 16 ("plates") fastened together in various shapes and sizes to form a die set of an approximate shape and length of a workpiece (not shown). The plates 16 can be made of steel or any other material capable of supporting the forces generated during the hydroform process. The plates 16 may be pre-formed to the approximate workpiece shape by methods such as bending, rolling, flame/gas cutting, and forging.

Figure 1:
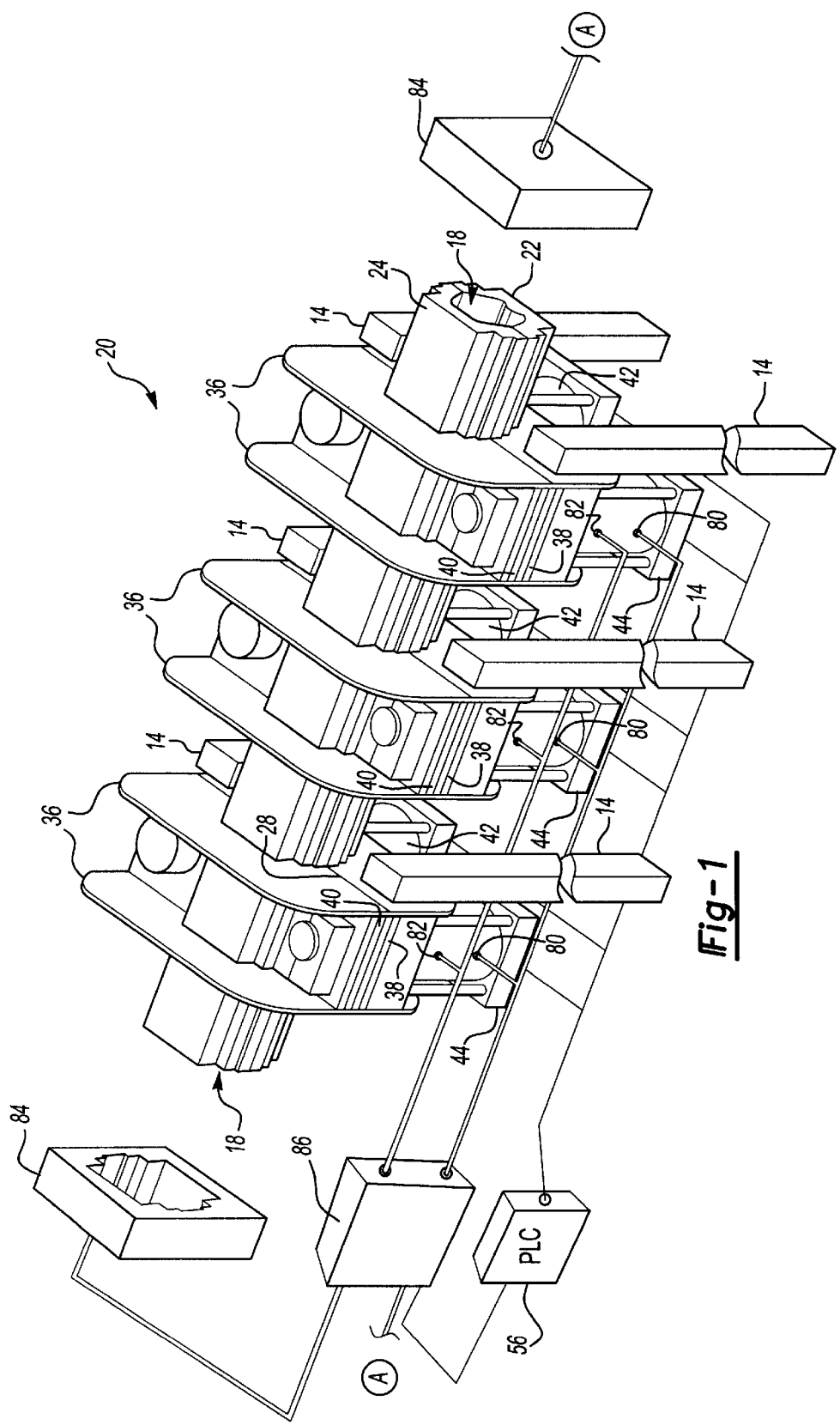
FIG. 1 illustrates a perspective view of the present invention.
Figure 5:
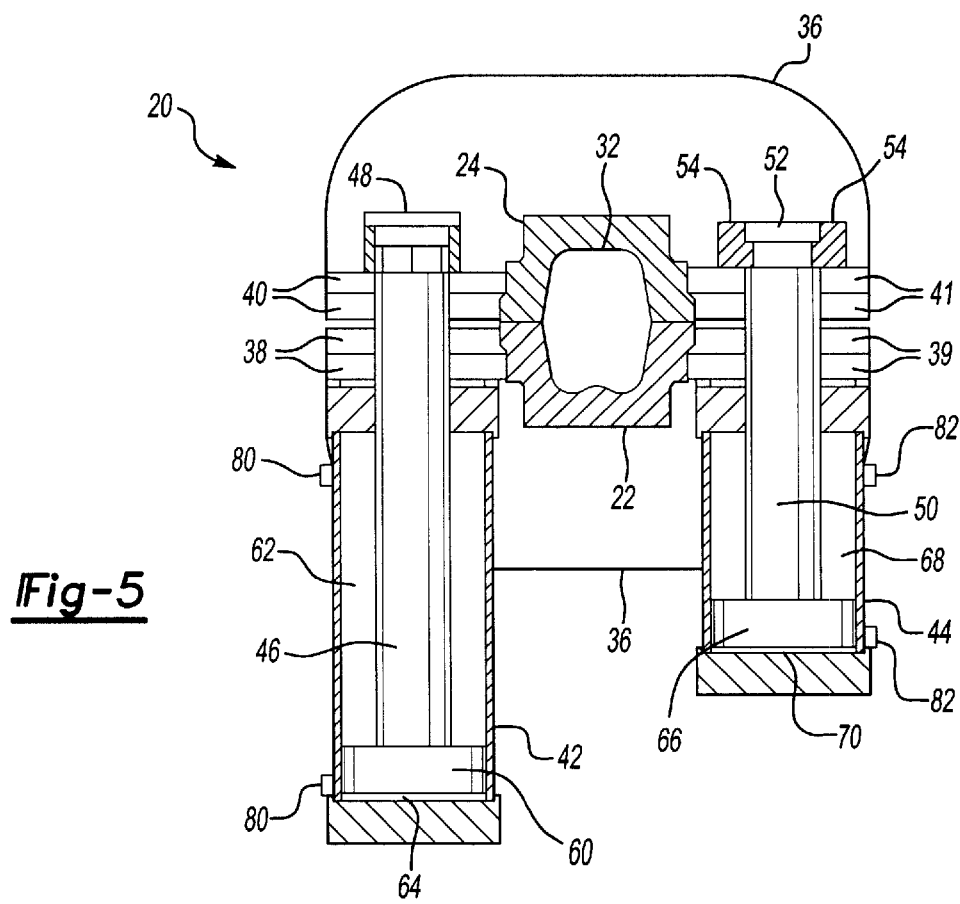
FIG. 5 illustrates a side view of the present invention including clamping hydraulic cylinder and activating hydraulic cylinder.

The plates 16 are fastened together along their perimeter using conventional means such as welding, as shown by weld points 26, or bolting (not shown). The plates 16, once fastened, form two halves: a mounted lower die half 22 and a movable upper die half 24. A parting line 28 separates die halves 22 and 24. For demonstration purposes only, the finished shape of a possible workpiece is indicated by line 30. The die halves 22 and 24, when in a closed position, as illustrated in FIGS. 1 and 5, create an interior surface that defines a shape of a die cavity in which the workpiece to be hydroformed is placed.

An alternate embodiment of the present invention could use a plurality of solid steel bar-stock pieces (versus plate stock) fastened together to form a die cavity (not shown) The bars could be formed to the approximate size, shape and geometry of the proposed workpiece by several conventional methods such as heating and bending. The bars could also be fastened together along their perimeter using conventional means such as welding or bolting. Mounting structures, described below, could be fastened to the shaped bars using conventional methods such as bolting or welding.

The lower die half 22 can be supported by a plurality of support pillars 14 in order to place the hydroforming system 20 at a height convenient for a typical worker. The support pillars 14 can be affixed to the lower die half 22 at one end and affixed to the floor at the other end. The support pillars 14 aid in supporting the weight of the system 20 and aid in preventing the system from moving during operation. Many other possible support pillar configurations would by obvious to one skilled in the art.

Figure 3:
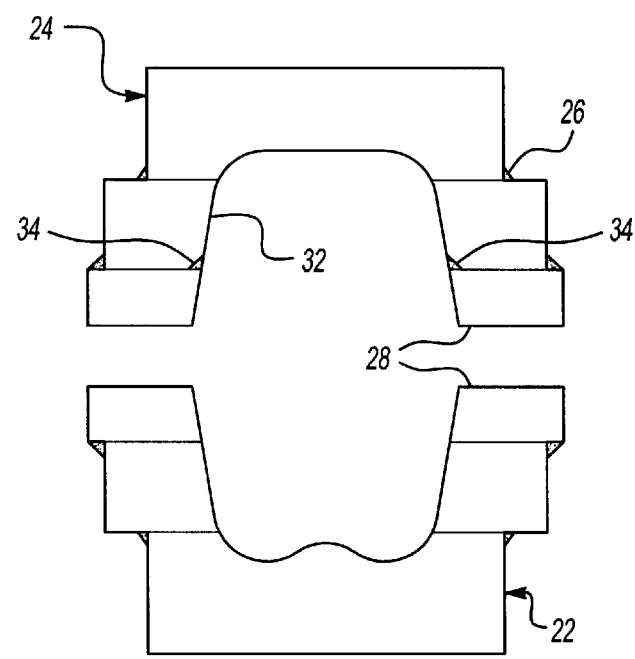
FIG. 3 illustrates a side view of a fabricated die set of the present invention machined to a workpiece shape.

Material from the die halves 22 and 24 can be removed in order to create the die cavity in the shape of the desired workpiece. The material may be removed using conventional methods such as milling or computer numerically controlled (CNC) machining, well known in the prior art. FIG. 3 illustrates a die cavity's machined surface 32 that generally defines the shape of the workpiece. Plates or bars that lose weld material at weld points 26 due to machining can be re-welded (for example at position 34) and re-machined or hand finished. The machined surface 32 is then finished by conventional means known in the art (e.g., repairing, detailing, grinding, sanding, and polishing) to create an acceptable production finish.

The die halves 22 and 24, during production (described in detail below), would have a means to seal ends of a workpiece using end plugs with drive cylinders 84 at position 18 of FIG. 1. These end plugs 84, conventional in the art, engage the ends of the workpiece placed within the die cavity. These end plugs are adapted to fill the workpiece with fluid, typically an incompressible fluid such as water, from a means to supply pressurized fluid (fluid pressure means) 86 and to keep it from escaping during the process. The pressure within the workpiece is then increased to such a magnitude that the workpiece is expanded outwardly to conform with the shape of the die cavity.

Figure 4:
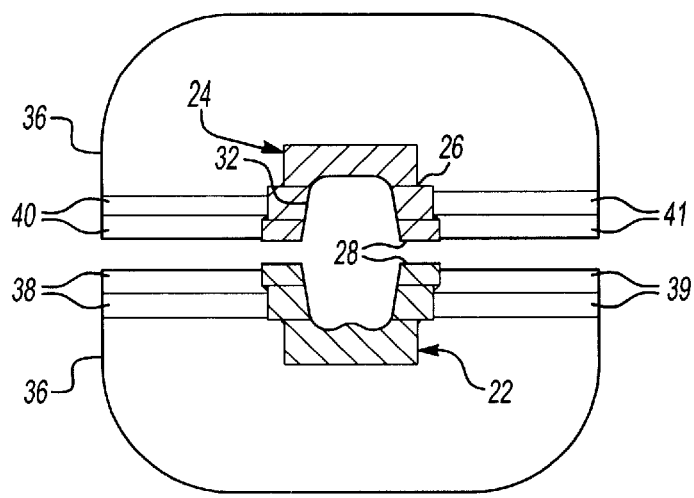
FIG. 4 illustrates a side view of a fabricated die set of the present invention including reinforcement.

FIG. 4 illustrates the die halves 22 and 24 with added elements including a plurality of reinforcement plates 36 (a first set on the upper die half and a second set on the lower die half), activation hydraulic cylinder mounting plates 38, clamping hydraulic cylinder mounting plates 39, activation hydraulic cylinder rod end mounting plates 40, and clamping hydraulic cylinder rod end mounting plates 41, all of which are mounted to the die halves 22 and 24 using conventional means such as welding or bolting. The illustrated embodiment, for demonstration purposes, uses six sets of reinforcement plates 36.

FIG. 5 adds and illustrates hydraulic cylinders. A plurality of activation hydraulic cylinders 42 are mounted to the activation hydraulic cylinder mounting plates 38. A plurality of clamping hydraulic cylinders 44 are mounted to the clamping hydraulic cylinder mounting plates 39.

The activation hydraulic cylinders 42 each have a first translation capable linear movement/linear transition mounted rod ("first cylinder rod") 46 attached to a first piston 60 that extends into and through the activation hydraulic cylinder rod end mounting plates 40. Each first cylinder rod 46 has a first translation capable linear movement/linear trasition mounted rod end ("first cylinder rod end") 48 that is fixedly mounted to the activation hydraulic cylinder rod end mounting plates 40. Within each of the activation hydraulic cylinders 42 are two chambers defined as a first clamping chamber 62 and a first extension chamber 64. Chambers 62 and 64 can have a plurality of first fluid entry and exit points 80. Fluid is pumped to and from the first clamping and first extension chambers 62 and 64 to provide the clamping and extension force needed, using pumping and control systems well known in the art.

The clamping hydraulic cylinders 44 each have a second translation capable linear movement/linear transition mounted rod ("second cylinder rod") 50 attached to a second piston 66 that extends into and through the clamping hydraulic cylinder rod end mounting plates 41. Within each of the clamping hydraulic cylinders 44 are two chambers defined as a second clamping chamber 68 and a second extension chamber 70. Each chamber 68 and 70 can have a plurality of second fluid entry and exit points 82. Fluid can be pumped to and from the second clamping and second extension chambers 68 and 70 to provide the clamping and extension force needed, using pumping and control systems well known in the art.

Figure 6:
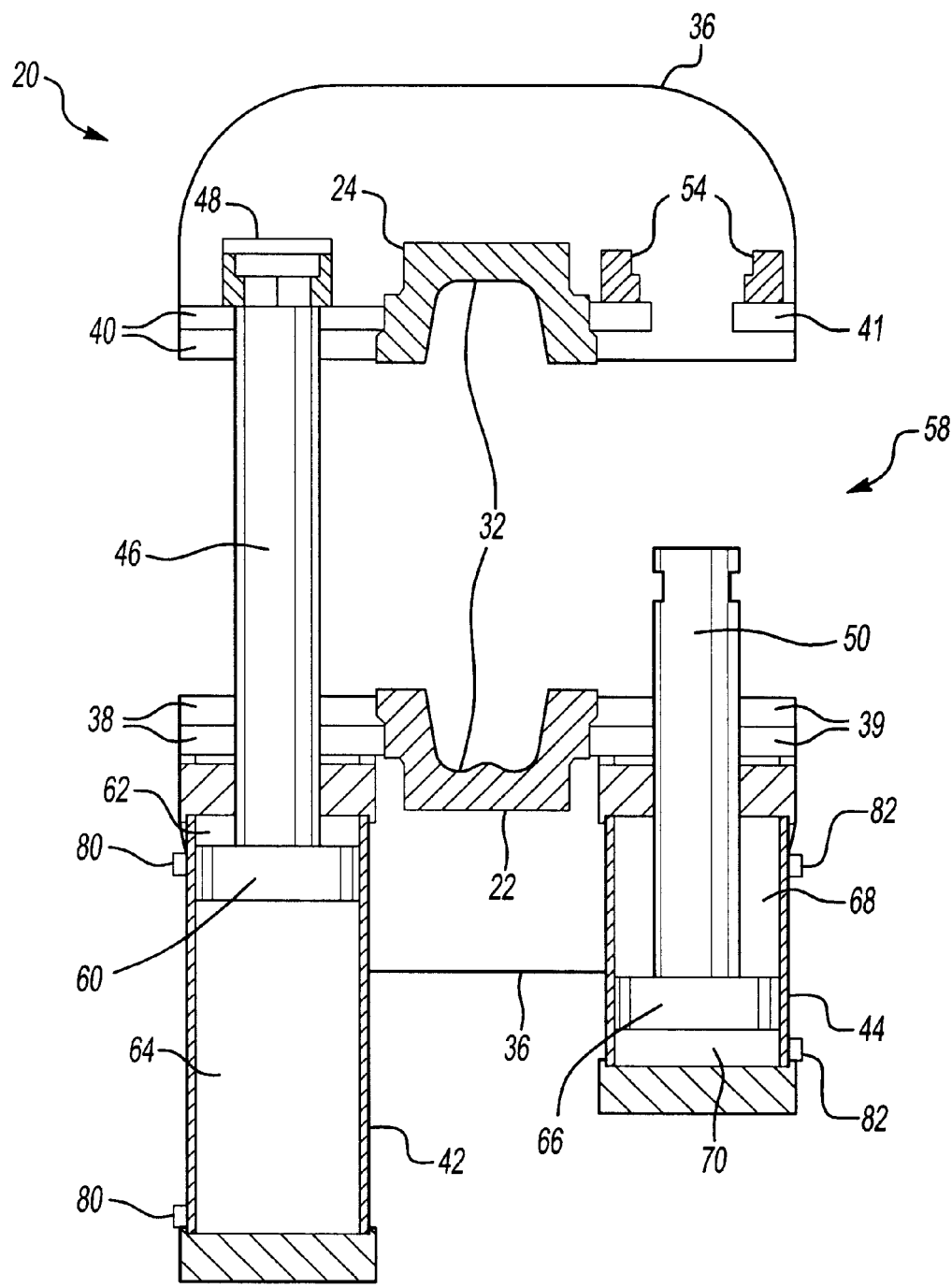
FIG. 6 illustrates a side view of the present invention in an open position.

Each second cylinder rod 50 has a second translation capable linear movement/linear transition mounted rod end ("second cylinder rod end") 52 that can be configured to lock into place on the clamping hydraulic cylinder rod end mounting plates 41. This can be accomplished by several means known in the art. The illustrated embodiment of the present invention is illustrated by the clamping hydraulic cylinder rod end mounting plate having 41 a rod end slide coupler/clevis unit 54 configured to receive the second cylinder rod end 52. FIG. 5 illustrates the rod end slide coupler/clevis unit 54 in its closed position. FIG. 6 illustrates the rod end slide coupler/clevis unit 54 in its open position. When the die halves 22 and 24 are in an open position, a workpiece-loading zone 58 is created allowing placement and removal of a workpiece.

With the rod end slide coupler/clevis unit 54 in its open position, the first cylinder rods 46 can be extended to raise the upper die half 24. When the die halves 22 and 24 are clamped (closed) and in the locked position, the first cylinder rods 46 and second cylinder rods 50 provide sufficient strength to hold the die halves 22 and 24 in place during hydroforming when the workpiece is expanded to conform to the die cavity as defined by the machined surface 32. The process and the forces generated during hydroforming have been simulated and analyzed using computer math modelling techniques.

The illustrated embodiment of present invention generally operates with two types of hydraulic cylinders: activating and clamping. It is noted that an alternate embodiment (not shown) could also use only activation hydraulic cylinders 42. The activation hydraulic cylinders 42 open the die halves 22 and 24 to allow insertion of pre-formed workpieces (not shown) or to remove the formed workpieces after a production cycle. The activation hydraulic cylinders 42 also close the die halves 22 and 24 with assistance from the clamping hydraulic cylinders 44.

The activation hydraulic cylinders 42 in combination with the clamping hydraulic cylinders 44 generate the clamping force required to keep die halves 22 and 24 from separating or deflecting under the internal fluidic pressure generated during the tube fill stage and resulting geometry change of the workpiece during hydroforming (tube forming stage). The tube fill and tube forming stages collectively being referred to as the pressurization stage. Following the pressurization stage, the activation hydraulic cylinders 42 control the opening of the die halves 22 and 24 for workpiece removal.

The clamping hydraulic cylinders 44 as shown in the illustrated embodiment differ from activation hydraulic cylinders 42 in four ways. First, as stated above, the clamping hydraulic cylinders 44 provide clamping force only to hold the die halves 22 and 24 together during the pressurization stage. The clamping hydraulic cylinders 44 are not needed to raise and lower the upper die half 24. Second, the clamping hydraulic cylinders 44 have a unique latching mechanism, the rod end slide coupler/clevis unit 54, between the second cylinder rod end 52 and the upper die half 24. This rod end slide coupler/clevis unit 54 engages when the upper die half 24 reaches a predetermined pause position. Preferably, the predetermined pause position is when the upper die half 24 is within approximately 50 mm of the stationary lower die half 22. By comparison, the activation hydraulic cylinders 42 have a fixed attachment on the first cylinder rod ends 48. Third, the clamping cylinders 44 allow unfettered ingress and egress of the workpiece because the second cylinder rods 50 do not reach into the workpiece loading zone 58 and can be retracted (lowered) out of the way. Finally, the clamping hydraulic cylinders 44 are more economical since second cylinder rods 50 have a shorter stroke and do not require linear control transducers (described below).

Figure 7:
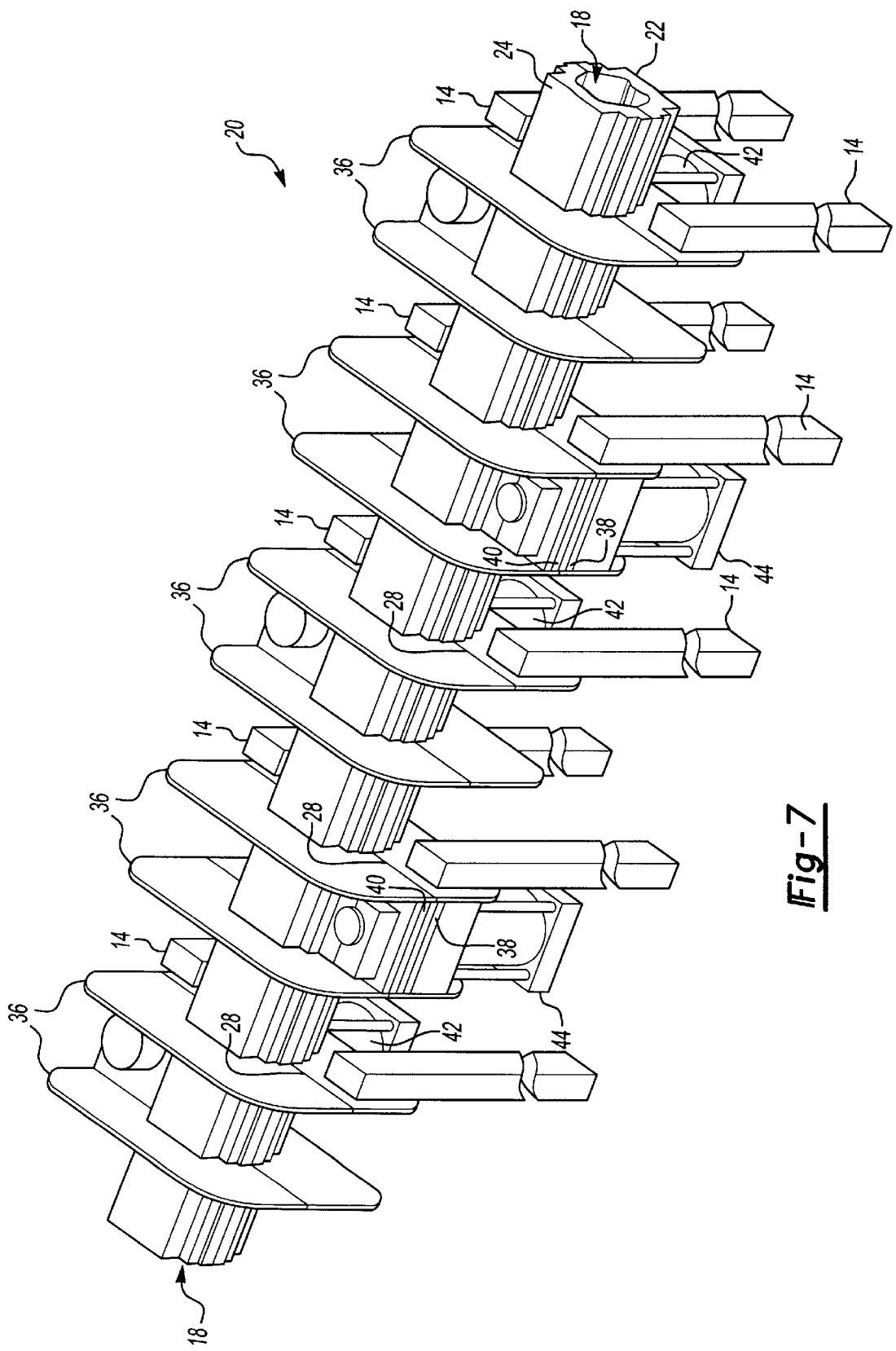
FIG. 7 illustrates a perspective view of an alternate embodiment of the present invention.

The activation hydraulic cylinders 42 and clamping hydraulic cylinders 44 of the present invention are arranged on the periphery of the die set. In the illustrated embodiment, the activation hydraulic cylinders 42 and the clamping hydraulic cylinders 44 placed directly across from each other, in an opposing orientation. In an alternate embodiment shown in FIG. 7, the activation hydraulic cylinders 42 and clamping hydraulic cylinders 44 can be placed in an alternating layout. To someone skilled in this art, cylinder layout and resulting die pull direction is unlimited and can be adjusted using sound engineering practices. Alternating or opposing activation hydraulic cylinders 42 and clamping hydraulic cylinders 44 positions on the periphery of the die set are necessary to distribute reaction forces as equally as possible. The equal distribution will limit vertical and side thrust tool deflection from the pressure to inconsequential amounts. A minimum of two activation hydraulic cylinders 42 are required for each die-set, to carry out opening and closing operations as well as to contribute to the overall clamping force. This hydroforming system 20 can operate vertically, horizontally, or at any orientation.

The movement of each activation hydraulic cylinder 42 is monitored by linear transducers (not shown) that are encased in the body of each activation hydraulic cylinder 42. The transducers transmit continuous linear position data to a computer control system (hereinafter referred to as Position Linear Control (PLC) 56 and illustrated in FIG. 1). The PLC 56 interprets incoming data from all the activation hydraulic cylinders 42. The PLC 56 also monitors and controls hydraulic fluid flow into and out of each activation hydraulic cylinder 42 and clamping hydraulic cylinder 44 via proportional valves at each cylinder's fluid entry and exit points 80 and 82. The PLC 56 also controls the operation of the clamping hydraulic cylinders 44 when they are required. The PLC 56 insures uniform speed, position, and self-alignment of the first cylinder rods 46 so that the two die halves 22 and 24 always remain parallel with each other.

The hydroforming system 20 of the present invention is designed to meet the individual needs of a specific workpiece. To meet individual needs, the forces acting on the die halves 22 and 24 must be calculated. First, the surface area of the die cavity is calculated. Next, the maximum pressure required to displace the tube wall during the pressurization stage is determined. This pressure varies by the size, thickness and geometry of the workpiece. The product of surface area and maximum pressure determines the outward force the workpiece puts on the die halves 22 and 24. The outward force is the force attempting to separate the die halves 22 and 24 (Die Separating Force=die cavity surface area multiplied by maximum pressure required to form the workpiece or tube).

The hydroforming system 20 of the present invention uses first cylinder rods 46 and second cylinder rods 50 of the activation hydraulic cylinders 42 and clamping hydraulic cylinders 44 respectively to generate the clamping force necessary to withstand the force that acts to separate the die halves 22 and 24. For example, when commanded, the system will force fluid into the first clamping chambers 62 and the second clamping chambers 68 to force the first piston 60 and second piston 66 through the cylinder. This force brings the die halves 22 and 24 together and holds them together until the fluid pressure in these chambers is released. The hydroforming system 20 can then command the die halves 22 and 24 to separate by forcing fluid in the extension chambers 64 and 70 of the activation and clamping hydraulic cylinders 42 and 44.

Hydraulic cylinders must also be evaluated to determine their output force. Output force is a function of the effective area of the cylinders. The cylinder's effective area is calculated using the formula for piston area (cylinder bore) minus the rod diameter area. The total output force of the plurality of activation hydraulic cylinders 42 and clamping hydraulic cylinders 44 is specified to exceed the separating force. The total output force of the plurality of activation hydraulic cylinders 42 and clamping hydraulic cylinders 44 should exceed the separating force.

When the total effective area of the activation and clamping hydraulic cylinders 42 and 44 is greater than the surface area of the machined die surface 32 and when the force requirements permit, a single power unit, the fluid pressure means 86, will be used to create both the fluid pressure used to form a workpiece and the hydraulic pressure used to clamp the plurality of activation and clamping hydraulic cylinders 42 and 44. This assures the fluid pressure necessary to form the workpiece can never override the clamping force. This condition can also reduce the cost of the equipment, since only one power unit is required for both the fluid pressure used to form the workpiece and the hydraulic pressure used to clamp the plurality of activation hydraulic cylinders 42 and clamping hydraulic cylinders 44.

Alternatively, when the total effective area of the activation and clamping hydraulic cylinders 42 and 44 is not greater than the surface area of the machined die surface 32 or when the force requirements do not permit the use the single fluid pressure supply means 86 to create both the fluid pressure used to form a workpiece and the hydraulic pressure used to clamp the plurality of activation and clamping hydraulic cylinders, separate fluid pressure supply means (not shown) will be used to create the fluid pressure used to form a workpiece and to create the hydraulic pressure used to clamp the plurality of activation and clamping hydraulic cylinders.

Putting all this in sequence, the actual hydroforming process begins with the die halves 22 and 24 in the open position. A length of tube representing the pre-formed workpiece is placed between the die halves 22 and 24. The PLC 56 commands the hydroforming sequence to initiate. Fluid is pumped into the first clamping chamber 62 and out of the first extension chamber 64 of the activation hydraulic cylinders 42 causing the die halves to close (i.e., the upper die half 24 moves to meet the lower die half 22).

When the upper die half 24 reaches a pause position, approximately 50 mm (pre-form part dependent) from the lower die half 22, the clamping hydraulic cylinders 44, second cylinder rod ends 52 and slide coupler/clevis unit 54 are engaged to assist the activation hydraulic cylinders 42. End plugs 84 are thrust into each end of the workpiece by typical hydraulic or air drive cylinders or other means known in the art. Pressurized fluid is pumped into the workpiece through gates in the end plugs 84 by the fluid supply means 86. Trapped air is forced to vent around the perimeter of the end plugs or through special ports using means known in the art.

Once the upper die half 24 meets the lower die half 22 to define the die cavity, fluid pressure increases and provides an outward force against the walls of the workpiece, causing the workpiece to expand and conform to the shape defined by the machined die surface 32 as the forming load reaches a maximum. Once the maximum forming load is achieved, a hydro-piercing operation takes place and fluid flow into the tube is stopped, the internal pressure is relieved, and the end plugs 84 are removed from the ends of the tube by reversing the hydraulic or air drive cylinders.

Fluid is evacuated from clamping chambers 62 and 68 of the activation hydraulic cylinders 42 and clamping hydraulic cylinders 44 while simultaneously being pumped into the extension chambers 64 and 70 of the activation hydraulic cylinders 42 and clamping hydraulic cylinders 44 on the other side of the pistons 60 and 66. The transfer of fluid causes the upper die half 24 to separate from the lower die half 22 to a pause position (the same pause position as for the closing phase), that depends on the size of the pre-formed workpiece or approximately 50 mm. At this point the rod end slide couplers/clevis units 54 are disengaged, the activation hydraulic cylinders 42 extend, lifting the upper die half 24 to a position that allows removal of the formed workpiece. At the same time that the activation hydraulic cylinders 42 are extending to open the die halves 22 and 24, the clamping cylinder rods 50 can be retracted to increase ingress/egress accessibility if required.

The above-described embodiment of the invention is provided purely for purposes of illustration. Many other variations, modifications, and applications of the invention may be made.

We claim:

1. A hydroforming apparatus comprising:
   a die set, comprising a mounted lower die half, and an adjacent movable upper die half, the die halves in closed position having an interior surface that defines a shape of a die cavity for receiving a workpiece, the upper die half having a first set of reinforcement plates attached along an exterior surface of the upper die half, the lower die half having a second set of reinforcement plates attached along an exterior surface of the lower die half;
   a means to seal ends of a workpiece;
   a means to increase internal fluid pressure of the workpiece to a predetermined level;
   a plurality of activation hydraulic cylinders mounted to the die halves comprising a first clamping chamber, a first extension chamber, a first cylinder rod having a first cylinder rod end, and a first piston, the first clamping chamber mounted to the lower die half, and the first cylinder rod end mounted to the upper die half;
   a means to pump hydraulic fluid into and out of the clamping and extension chambers of the plurality of activation cylinders; and
   a computer control system.

2. The apparatus of claim 1 further comprising a plurality of clamping hydraulic cylinders mounted to the die halves comprising, a second clamping chamber, a second extension chamber, a second cylinder rod having a second cylinder rod end, and a second piston, the second clamping chamber mounted to the lower die half, and the second cylinder rod end releasably mounted to the upper die half.

3. The apparatus of claim 2, further comprising linear transducers encased in the activation hydraulic cylinders that transmit continuous linear position data to the computer control system, wherein the computer control system interprets incoming data from all of the activation hydraulic cylinders and monitors and controls hydraulic fluid flow into and out of each of the activation and clamping hydraulic cylinders.

4. The apparatus of claim 2 wherein the means to increase internal fluid pressure of the workpiece to a predetermined level and the means to pump hydraulic fluid into and out of the clamping and extension chambers of the plurality of activation and clamping hydraulic cylinders comprises a single power unit used to create both the fluid pressure used to form the workpiece and the hydraulic pressure used to clamp the plurality of activation and clamping hydraulic cylinders.

5. The apparatus of claim 2 wherein the means to increase internal fluid pressure of the workpiece to a predetermined level and the means to pump hydraulic fluid into and out of the clamping and extension chambers of the plurality of activation and clamping hydraulic cylinders comprises separate power unit used to create the fluid pressure used to form the workpiece and the hydraulic pressure used to clamp the plurality of activation and clamping hydraulic cylinders.

6. The apparatus of claim 1 wherein the mounted lower die half and the movable upper die half are comprised of a plurality of individual plates fastened together to form a die cavity.

7. The apparatus of claim 6 wherein the plates are fastened together by welding.

8. The apparatus of claim 6 wherein the plates are fastened together by bolting.

9. The apparatus of claim 1 wherein the mounted lower die half and the movable upper die half are comprised of a plurality of solid steel bar-stock pieces fastened together to form a die cavity.

10. The apparatus of claim 9 wherein the steel bar-stock pieces are fastened together by welding.

11. The apparatus of claim 9 wherein the steel bar stock pieces are fastened together by bolting.

12. The apparatus of claim 1 further comprising support pillars affixed to the lower die half.

13. The apparatus of claim 2 wherein the activation hydraulic cylinders and clamping hydraulic cylinders are arranged on the periphery of the die set to distribute reaction forces substantially equally.

14. The apparatus of claim 13 wherein the activation hydraulic cylinders and clamping hydraulic cylinders are arranged in opposing orientation.

15. The apparatus of claim 13 wherein the activation hydraulic cylinders and clamping hydraulic cylinders are arranged in an alternating layout.

16. The apparatus of claim 2 wherein a total output force of the plurality of activation hydraulic cylinders and clamping hydraulic cylinders is specified to exceed a separating force.

17. The apparatus of claim 1 wherein at least two activation hydraulic cylinders are required.

18. A hydroforming method in a system comprising a a die set having a mounted lower die half, and an adjacent movable upper die half, the die halves in closed position having an interior surface that defines a shape of a die cavity for receiving a workpiece, the upper die half having a first set of reinforcement plates attached along an exterior surface of the upper die half, the lower die half having a second set of reinforcement plates attached along an exterior surface of the lower die half;
   a means to seal ends of a workpiece;
   a means to increase internal fluid pressure of the workpiece to a predetermined level;
   a plurality of activation hydraulic cylinders mounted to the die halves comprising a first clamping chamber, a first extension chamber, a first cylinder rod having a first cylinder rod end, and a first piston, the first clamping chamber mounted to the lower die half, and the first cylinder rod end mounted to the upper die half;
   a plurality of clamping hydraulic cylinders mounted to the die halves comprising, a second clamping chamber, a second extension chamber, a second cylinder rod having a second cylinder rod end, and a second piston, the second clamping chamber mounted to the lower die half, and the second cylinder rod end releasably mounted to the upper die half with a slide couplers/clevis unit;
   a means to pump hydraulic fluid into and out of the clamping and extension chambers of the plurality of activation and clamping hydraulic cylinders; and
   a computer control system, the method comprising the steps of:
   raising the upper die half;
   placing a length of tube, representing the workpiece, between the mounted lower die half and the raised upper die half;
   pumping fluid out of the extension chambers and into the clamping chambers of the activation hydraulic cylinders causing the upper die half to move to meet the lower die half;

engaging the clamping hydraulic cylinders when the upper die half reaches a pause position; assisting the activation hydraulic cylinders by engaging the second cylinder rod ends and the slide couplers/clevis units;

thrusting end plugs onto ends of the workpiece using drive cylinders;

providing, by fluid pressure, an outward force against the walls of the workpiece to expand and conform to the shape defined by the die cavity surface;

stopping fluid flow into the workpiece when the forming load reaches a predetermined maximum;

relieving the internal pressure;

removing the end plugs from the ends of the workpiece by reversing the drive cylinders;

evacuating the fluid from the clamping chambers of the plurality of activation hydraulic cylinders and clamping hydraulic cylinders while simultaneously pumping fluid into the extension chambers of the activation hydraulic cylinders and clamping hydraulic cylinders, causing the upper die half to separate from the lower die half to a pause position;

disengaging the rod end slide couplers/clevis units; and causing the upper die half to further separate from the lower die half to a position that allows removal of the formed workpiece.

19. The method of claim 18 further comprising the step of retracting the clamping cylinder rods thereby increasing accessibility to the workpiece.

20. The method of claim 19 wherein the means to increase internal fluid pressure of the workpiece to a predetermined level and the means to pump hydraulic fluid into and out of the clamping and extension chambers of the plurality of activation and clamping hydraulic cylinders comprises separate power units used to create the fluid pressure used to form the workpiece and the hydraulic pressure used to clamp the plurality of activation and clamping hydraulic cylinders.

21. The method of claim 18 wherein the means to increase internal fluid pressure of the workpiece to a predetermined level and the means to pump hydraulic fluid into and out of the clamping and extension chambers of the plurality of activation and clamping hydraulic cylinders comprises separate power units used to create both the fluid pressure used to form the workpiece and the hydraulic pressure used to clamp the plurality of activation and clamping hydraulic cylinders.

* * * * *